(12) United States Patent
Kim

(10) Patent No.: US 9,099,707 B2
(45) Date of Patent: Aug. 4, 2015

(54) BATTERY PACK

(75) Inventor: Bongyoung Kim, Suwon-si (KR)

(73) Assignee: SAMSUNG SDI CO., LTD., Suwon-si, Gyeonggi-do (KR)

( * ) Notice: Subject to any disclaimer, the term of this patent is extended or adjusted under 35 U.S.C. 154(b) by 723 days.

(21) Appl. No.: 12/789,762

(22) Filed: May 28, 2010

(65) Prior Publication Data

US 2011/0003196 A1    Jan. 6, 2011

(30) Foreign Application Priority Data

Jul. 6, 2009    (KR) .................. 10-2009-0061389

(51) Int. Cl.
| H01M 2/02 | (2006.01) |
| H01M 2/06 | (2006.01) |
| H01M 2/04 | (2006.01) |
| H01M 2/08 | (2006.01) |
| H01M 2/10 | (2006.01) |
| H01M 10/42 | (2006.01) |

(52) U.S. Cl.
    CPC .............. *H01M 2/06* (2013.01); *H01M 2/0404* (2013.01); *H01M 2/08* (2013.01); *H01M 2/1066* (2013.01); *H01M 10/425* (2013.01)

(58) Field of Classification Search
    None
    See application file for complete search history.

(56) References Cited

U.S. PATENT DOCUMENTS

| 2002/0150815 A1 | 10/2002 | Ehara |
| 2005/0181242 A1 | 8/2005 | Suzuki et al. |
| 2008/0292955 A1* | 11/2008 | Byun et al. .................... 429/163 |
| 2009/0068501 A1 | 3/2009 | Hong et al. |
| 2009/0317715 A1 | 12/2009 | Jung et al. |
| 2010/0178536 A1 | 7/2010 | Kwak et al. |
| 2011/0020672 A1 | 1/2011 | Baek et al. |

FOREIGN PATENT DOCUMENTS

| JP | 08230486 A * | 9/1996 |
| JP | 2002-313295 A | 10/2002 |
| KR | 10-2005-0046600 A | 5/2005 |
| KR | 100649659 B1 | 11/2006 |
| KR | 100685605 B1 | 2/2007 |
| KR | 10-2008-0036253 A | 4/2008 |
| KR | 10-2008-0103652 A | 11/2008 |
| KR | 10-2009-0026697 A | 3/2009 |
| KR | 1020090039503 A | 4/2009 |
| KR | 10-2010-0082532 A | 7/2010 |
| WO | WO 2008/066222 A1 | 6/2008 |

(Continued)

OTHER PUBLICATIONS

KIPO Korean Office Action corresponding to Korean Patent Application No. 10-2009-0061389 dated Nov. 24, 2010, 3 pages.

(Continued)

*Primary Examiner* — Ula C. Ruddock
*Assistant Examiner* — Daniel Gatewood
(74) *Attorney, Agent, or Firm* — Knobbe Martens Olson & Bear LLP

(57) ABSTRACT

A battery pack, which prevents a circuit module from being bent, has durability against an external impact, and is easily welded. The battery pack includes a bare cell on which an electrode terminal protrudes from a surface thereof, a circuit module disposed on the surface of the bare cell and electrically connected to the bare cell, and an elastic holder disposed between the circuit module and the surface of the bare cell and through which the electrode terminal passes. The elastic holder comprises an elastic material.

28 Claims, 10 Drawing Sheets

(56) References Cited

FOREIGN PATENT DOCUMENTS

| WO | WO 2008066222 A1 | * | 6/2008 |
| WO | WO 2009051388 A2 | * | 4/2009 |

OTHER PUBLICATIONS

Korean Notice of Allowance issued by the Korean Intellectual Property Office dated Jul. 29, 2011, 5 pages.

* cited by examiner

BATTERY PACK

CROSS-REFERENCE TO RELATED APPLICATION

This application claims the benefit of Korean Patent Application No. 10-2009-0061389, filed Jul. 6, 2009 in the Korean Intellectual Property Office, the disclosure of which is incorporated herein by reference.

BACKGROUND

1. Field

Embodiments relate to a battery pack.

2. Description of the Related Art

Lithium ion secondary batteries may be manufactured in a battery pack configuration. A battery pack may include a bare cell, a circuit module, and an external cover. The bare cell may include an electrode assembly (including a positive electrode plate, a negative electrode plate, and a separator), a can for receiving the electrode assembly, and a cap assembly for sealing an upper end opening of the can. The circuit module may include a circuit device such as a charge/discharge device and a protective circuit device and be coupled to the bare cell. The external cover may cover the circuit module.

Generally, structural durability and quality of battery packs may deteriorate due to external impacts. Thus, battery packs with structures durable against external impacts are required.

SUMMARY

Embodiments of the present invention are directed to a battery pack, which can prevent a circuit module from being bent, improve durability against an external impact, and be easily welded.

Aspects of the present invention provide a battery pack including: a bare cell on which an electrode terminal protrudes from a surface thereof; a circuit module disposed on the surface of the bare cell and electrically connected to the bare cell; and an elastic holder disposed between the circuit module and the surface of the bare cell and through which the electrode terminal passes, wherein the elastic holder comprises an elastic material.

According to another aspect of the present invention, the elastic holder may be formed of a plastic material.

According to another aspect of the present invention, the elastic holder may be formed of a material selected from the group consisting of ethylene vinylacetate copolymer (EVA), thermoplastic polyamide elastomer (TPAE), polyethylene (PE), thermoplastic polyester elastomer (TPEE), polyether ether ketone (PEEK), liquid crystal polymer (LCP), polyoxymethylene (POM), acrylonitrile butadiene styrene resin (ABS), styrene acrylonitrile copolymer (SAN), polypropylene (PP), polycarbonate (PC), and combinations thereof.

According to another aspect of the present invention, the elastic holder may be attached to the surface of the bare cell by an adhesive member.

According to another aspect of the present invention, the elastic holder may include: a holder bottom part attached to the surface of the bare cell; a holder sidewall part extending from an edge of the holder bottom part toward the circuit module; a holder tension part bent from an edge of the holder sidewall part to extend in an outside direction of the holder sidewall part; and a holder opening part formed in a region of the holder bottom part corresponding to the electrode terminal.

According to another aspect of the present invention, the holder tension part may have a thickness less than that of the holder sidewall part.

According to another aspect of the present invention, the holder sidewall part may be perpendicular to the holder bottom part.

According to another aspect of the present invention, the holder sidewall part may have a rounded sectional shape convex from an outside direction of the holder sidewall part toward an inside direction.

According to another aspect of the present invention, the battery pack may further include an interference prevention groove extending from a portion of the holder tension part contacting the circuit module toward the holder sidewall part.

According to another aspect of the present invention, the holder sidewall part may be disposed parallel to a long side direction of the surface of the bare cell.

According to another aspect of the present invention, the battery pack may further include an electrode lead plate coupled to a bottom surface of the circuit module and connected to the electrode terminal.

According to another aspect of the present invention, the According to another aspect of the present invention, the elastic holder may include a rib inserted into and coupled to the circuit module.

According to another aspect of the present invention, the rib may be integrally formed with the elastic holder.

According to another aspect of the present invention, the circuit module may include a circuit board, and a rib coupling groove may be formed in a position of the circuit board corresponding to the rib to insert the rib therein.

According to another aspect of the present invention, the rib coupling groove may be disposed in an outer circumference of a long side direction of the circuit board.

According to another aspect of the present invention, the elastic holder may include: a holder bottom part attached to the surface of the bare cell; a holder sidewall part extending from an edge of the holder bottom part toward the circuit module; a tension hole formed in the holder sidewall part; and a holder opening part formed in a region of the holder bottom part corresponding to the electrode terminal, wherein the rib may protrude from an edge of the holder sidewall part corresponding to the tension hole toward the circuit module.

According to another aspect of the present invention, the holder sidewall part may be perpendicular to the holder bottom part.

According to another aspect of the present invention, the holder sidewall part may have a rounded sectional shape convex from an inside direction of the holder sidewall part toward an outside direction.

According to another aspect of the present invention, the holder sidewall part may include: a first bending part extending from the holder bottom part such that it is inclined in an inside direction of the elastic holder; a second bending part bent from the first bending part to extend in an outside direction of the elastic holder to be parallel to the holder bottom part; and a third bending part extending from the second bending part to be perpendicular to the second bending part.

According to another aspect of the present invention, the holder sidewall part may have a rounded sectional shape convex from an outside direction of the holder sidewall part toward an inside direction.

According to another aspect of the present invention, the holder sidewall part may be disposed parallel to a long side direction of the surface of the bare cell.

According to another aspect of the present invention, the battery pack may further include a sidewall protrusion disposed below the tension hole of the holder sidewall part.

According to another aspect of the present invention, the battery pack may further include a top cover covering the circuit module, wherein the top cover may include a protrusion coupling groove in which the sidewall protrusion is inserted.

According to another aspect of the present invention, the elastic holder may include: a holder bottom part disposed at a position spaced from the surface of the bare cell toward the circuit module, the holder bottom part being parallel to the surface of the bare cell; holder sidewall parts facing each other with respect to the holder bottom part and connected to the holder bottom part in middle regions thereof, the holder sidewall parts having a rounded sectional shape protruding toward a center of the holder bottom part; a tension hole formed in the respective holder sides parts; and a holder opening part formed in a region of the holder bottom part corresponding to the electrode terminal, wherein the rib may protrude from an edge of the holder sidewall part corresponding to the tension hole toward the circuit module.

According to another aspect of the present invention, a spaced distance of the holder sidewall parts facing each other at the portions contacting the surface of the bare cell may be less than a width of a top surface of the bare cell.

According to another aspect of the present invention, the holder sidewall parts may be disposed parallel to a long side direction of the surface of the bare cell.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION

Figure 1A:
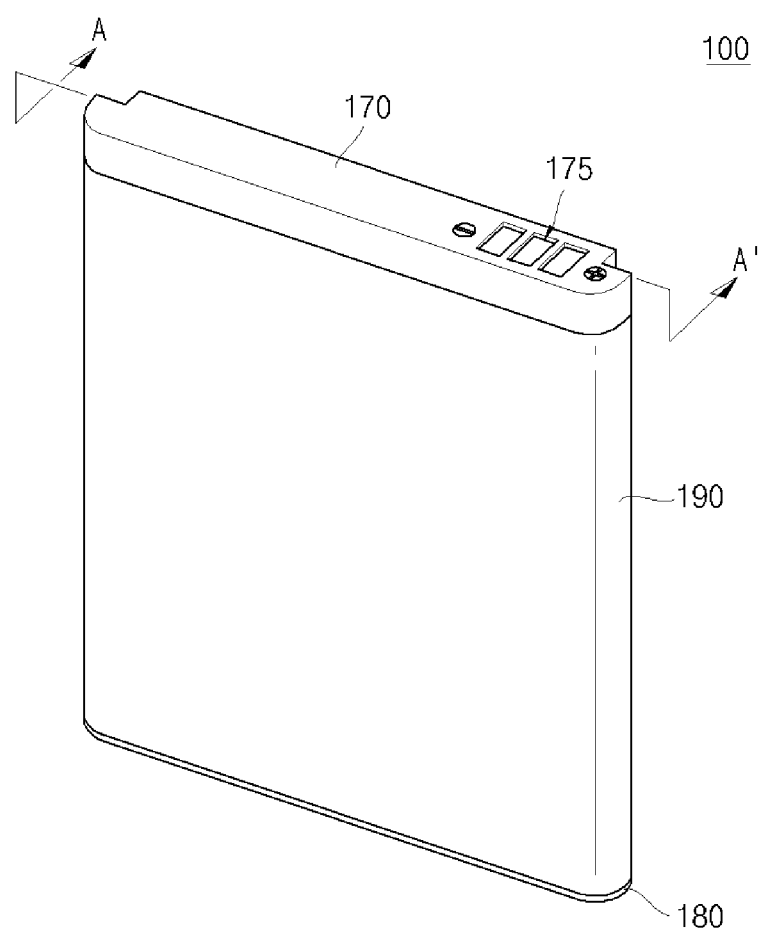
FIG. 1A illustrates a perspective view of a battery pack according to an embodiment of the present invention.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Figure 1B:
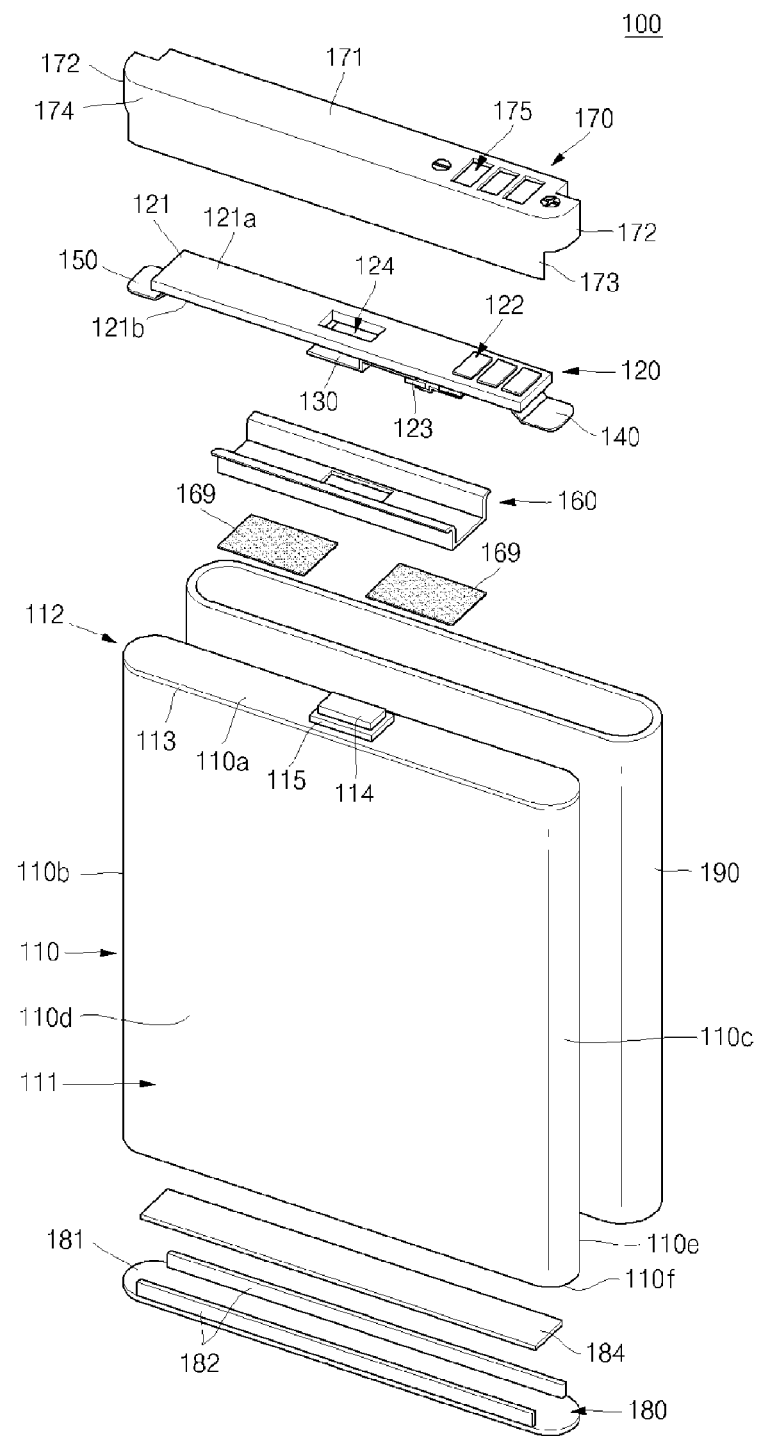
FIG. 1B illustrates an exploded perspective view of the battery pack of FIG. 1A.
Figure 1C:
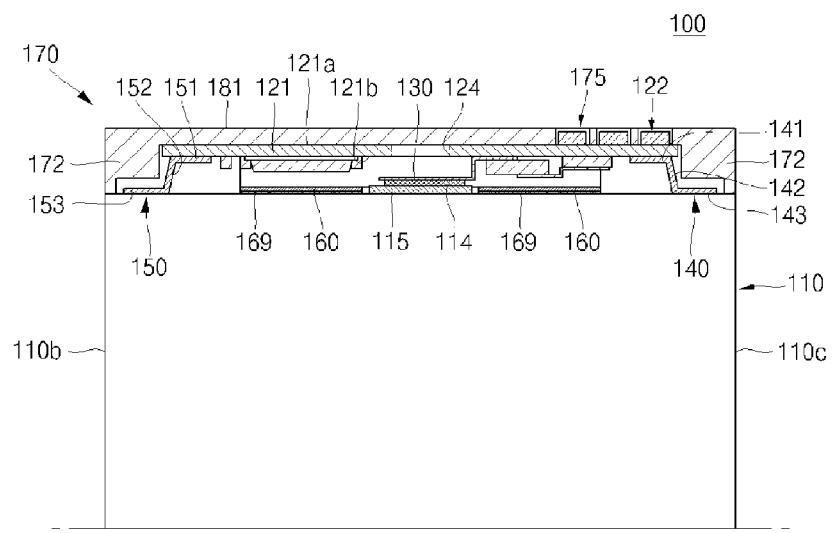
FIG. 1C illustrates a sectional view taken along line A-A' of FIG. 1A before the battery pack is labeled.
Figure 2:
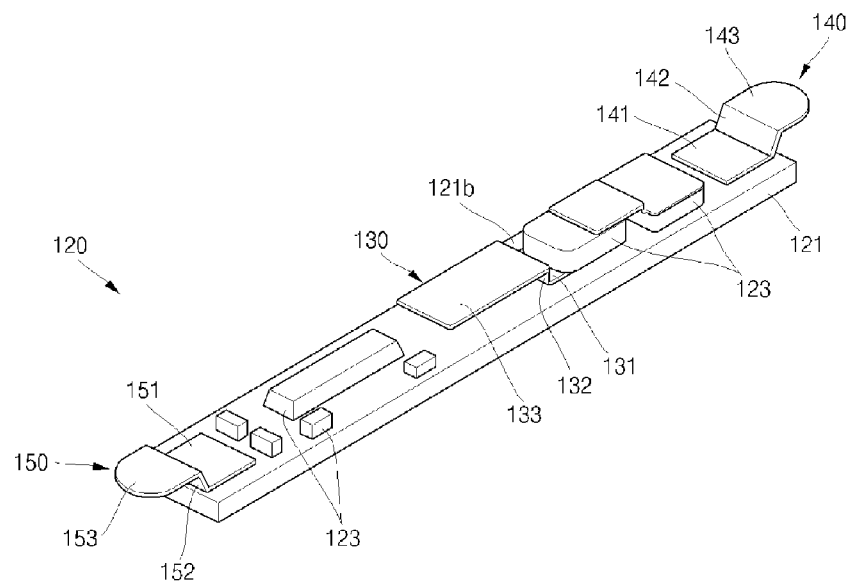
FIG. 2 illustrates a perspective view of a lower portion of the battery pack of FIG. 1B.

FIG. 1A illustrates a perspective view of a battery pack according to an embodiment, and FIG. 1B illustrates an exploded perspective view of the battery pack of FIG. 1A. FIG. 1C illustrates a sectional view taken along line A-A' of FIG. 1A before the battery pack is labeled, and FIG. 2 illustrates a perspective view of a lower portion of the battery pack of FIG. 1B.

Referring to FIGS. 1A to 1C, a battery pack 100 according to the shown embodiment includes a bare cell 110, a circuit module 120, an electrode lead plate 130, a first lead plate 140, a second lead plate 150, an elastic holder 160, a top cover 170, a bottom cover 180, and a label 190.

The bare cell 110 and the circuit module 120 are electrically connected to each other through the electrode lead plate 130, the first lead plate 140, and the second lead plate 150 to form a core pack. The core pack is coupled to the top cover 170 and the bottom cover 180 and labeled by the label 190 to complete the battery pack 100. The circuit module 120 is disposed on the elastic holder 160 such that the circuit module 120 rests upon and is supported by the elastic holder 160. An example of the circuit module 120 is a printed circuit board (PCB), however, aspects of the present invention are not limited thereto.

The bare cell 110 supplies electricity and includes an electrode assembly (not shown), a container-type can 111, and a cap assembly 112. The electrode assembly includes a positive electrode (not shown), a negative electrode (not shown), and a separator (not shown) disposed between the positive electrode and the negative electrode, but the invention is not limited thereto. The can 111 is formed of a metallic material and receives the electrode assembly and an electrolyte (not shown). The cap assembly 112 seals an opening of the can 111. As shown, the cap assembly 112 includes a cap plate 113 formed of a metallic material, an electrode terminal 114 protruding from the cap plate 113, and a gasket 115 disposed between the cap plate 113 and the electrode terminal 114 to electrically insulate the electrode terminal 114 from the cap plate 113.

The can 111 and the cap plate 113 themselves serve as a positive terminal or a negative terminal. In this embodiment, the can 111 and the cap plate 113 serving as the positive terminal will be described. Thus, the electrode terminal 114 serves as the negative terminal. Alternatively, the can 111, the cap plate 113, and the electrode terminal 114 is changed in polarity.

Referring to FIG. 1B, the bare cell 110 has a top surface 110a, a pair of short side surfaces 110b and 110c, a pair of long side surfaces 110d and 110e, and a bottom surface 110f. The electrode terminal 114 protrudes from the top surface 110a in a state where the electrode terminal 114 is insulated from the top surface 110a by the gasket 115. The pair of short side surfaces 110b and 110c and the pair of long side surfaces 110d and 110e are connected to the top surface 110a. The bottom surface 110f is connected to the side surfaces 110b, 110c, 110d, and 110e and faces the top surface 110a. Here, the pair of short side surfaces 110b and 110c designates surfaces having a relatively narrow width among the side surfaces 110b, 110c, 110d, and 110e connected to the top surface 110a of the bare cell 110. The pair of long side surfaces 110d and 110e designates surfaces having a relatively wide width among the side surfaces 110b, 110c, 110d, and 110e of the bare cell 110.

The circuit module 120 is disposed on an upper portion of the bare cell 110 and electrically connected to the bare cell 110. The circuit module 120 includes a circuit board 121, an external terminal 122, and a hole 124 for welding. However, the circuit module 120 may have additional elements in addition to or instead of the circuit board 121, the external terminal 122, and/or hole 124.

The circuit board 121 includes a plate formed of a resin. The circuit board 121 includes a circuit (not shown) for controlling charging and discharging of the bare cell 110 or a protective circuit (not shown) such as a circuit for preventing the bare cell 110 from being over-discharged and overcharged. The circuit board 121 includes a circuit device 123 configured to realize a charge/discharge circuit (not shown) and the protective circuit (not shown) on a bottom surface 121b of the circuit board 121. In the shown embodiment, a top surface 121a of the circuit board 121 is equal to that of the circuit module 120, and the bottom surface 121b of the circuit board 121 is equal to that of the circuit module 120.

The external terminal 122 is disposed on the top surface 121a of the circuit board 121 to electrically connect the circuit board 121 to an external electric device (not shown).

The hole 124 for welding passes through the top surface 121a and the bottom surface 121b of the circuit board 121. The hole 124 is defined in a region corresponding to the electrode terminal 114 of the bare cell 110 to provide a welding space when the electrode lead plate 130 is welded to the electrode terminal 114 of the bare cell 110 by laser welding. However, if other bonding techniques are used, the hole 124 need not be included.

The electrode lead plate 130 is disposed on the bottom surface 121b of the circuit board 121 and is electrically connected to a negative interconnection pattern (not shown) of the circuit module 120. Also, the electrode lead plate 130 is electrically connected to the electrode terminal 114 by laser welding through the hole 124. The electrode lead plate 130 is formed of a metallic material, e.g., nickel or nickel alloy. Here, the electrode lead plate 130 is electrically connected to the electrode terminal 114 to serve as a negative electrode, like the electrode terminal 114.

Specifically, referring to FIG. 2, the shown electrode lead plate 130 has a "Z" shape including an electrode lead bottom part 131, an electrode lead sidewall part 132, and an electrode lead extension part 133. The electrode lead bottom part 131 contacts a peripheral surface of the hole 124 for welding to the bottom surface 121b of the circuit board 121 and is electrically connected to the circuit device 123 (e.g., a positive temperature coefficient (PTC) device) disposed around the hole 124 for welding.

The electrode lead sidewall part 132 is bent from the electrode lead bottom part 131 to extend toward the bare cell 110. The electrode lead extension part 133 is bent and extends from the electrode lead sidewall part 132 to contact the electrode terminal 114. Thus, the electrode lead extension part 133 is substantially parallel to the electrode lead bottom part 131. The electrode lead extension part 133 is disposed at a position corresponding to the hole 124 and is substantially welded to the electrode terminal 114 by welding through the hole 124.

The first lead plate 140 is coupled to one side of the circuit module 120 and is electrically connected to a positive interconnection pattern (not shown) of the circuit module 120. Also, the first lead plate 140 extends such that it is connected to the top surface 110a of the bare cell 110 to electrically connect the bare cell 110 to the circuit module 120. The first lead plate 140 is formed of a metallic material, e.g., nickel or nickel alloy, however, aspects of the present invention are not limited thereto. As shown, the first lead plate 140 is connected to the top surface 110a (i.e., it constitutes the cap plate 113) of the bare cell 110 to serve as a positive electrode.

Specifically, referring to FIG. 2, the first lead plate 140 includes a first lead bottom part 141, a first lead sidewall part 142, and a first lead extension part 143 and is also shaped in a "Z" shape.

The first lead bottom part 141 has a plate shape to contact a side of the bottom surface 121b of the circuit board 121 and is electrically connected to the circuit module 120 by laser welding. The first lead sidewall part 142 is bent from the first lead bottom part 141 and extends toward the top surface 110a of the bare cell 110 to secure a distance between the circuit module 120 and the bare cell 110. The first lead extension part 143 is bent and extends from the first lead sidewall part 142 to contact the top surface 110a of the bare cell 110. Thus, the first lead extension part 143 is substantially parallel to the first lead bottom part 141. The first lead extension part 143 is electrically connected to the top surface of the bare cell 110 by laser welding.

The second lead plate 150 is coupled to the other side of the circuit module 120 such that it is symmetrical with respect to the first lead plate 140 and is electrically connected to the positive interconnection pattern (not shown) of the circuit module 120. Also, the second lead plate 150 extends such that it is connected to the top surface 110a of the bare cell 110 to electrically connect the bare cell 110 to the circuit module 120. The second lead plate 150 has the same configuration and size as the first lead plate 140 and be formed of the same material as the first lead plate 140 as shown, but it need not in all aspects of the invention. The second lead plate 150 includes a second lead bottom part 151, a second lead sidewall part 152, and a second lead extension part 153. Referring to FIG. 2, the second lead bottom part 151, the second lead sidewall part 152, and the second lead extension part 153 of the second lead plate 150 correspond to the first lead bottom part 141, the first lead sidewall part 142, and the first lead extension part 143 of the first lead plate 140, respectively. Thus, detailed descriptions with respect to the second lead plate 150 will be omitted.

The second lead plate 150 including the above-described components is disposed on the upper portion of the bare cell 110 together with the first lead plate 140 to maintain the circuit module 120 in a horizontal state. Accordingly, where the first lead plate 140 is disposed on only one side of an existing circuit module, the second lead plate 150 prevents the quality of the battery from being deteriorated due to the bending of the circuit module 120 generated when the first lead plate 140 is welded to the top surface 110a of the bare cell 110 by laser welding.

The elastic holder 160 is shaped such that the electrode terminal 114 of the bare cell 110 passes through the elastic holder 160 via the opening part 164. The elastic holder 160 is attached to the top surface 110a of the bare cell 110 using an adhesive member 169, e.g., a double-sided adhesive tape. Thus, the elastic holder 160 is disposed between the circuit module 120 and the top surface 110a of the bare cell 110. The elastic holder 160 supports the circuit module 120 to prevent the circuit module 120 from being bent by an external impact. Therefore, the battery pack 100 has durability against external impacts.

The elastic holder 160 is formed of an elastic material, but the invention is not limited thereto. Thus, the elastic holder 160 is flexibly tensioned where the circuit module 120 is compressed toward the bare cell 110 to weld the electrode terminal 114 to the electrode lead plate 130 after the circuit module 120 is seated on the top surface 110a of the bare cell 110. As a result, the elastic holder 160 allows the electrode terminal 114 and the electrode lead plate 130 to be easily welded to each other. Here, the elastic holder 160 is formed of a plastic material, which is an insulating elastic material, to prevent the bare cell 110 and the circuit module 120 from unnecessarily short-circuiting with each other. For example, the plastic material is selected from the group consisting of ethylene vinylacetate copolymer (EVA), thermoplastic polyamide elastomer (TPAE), polyethylene (PE), thermoplastic polyester elastomer (TPEE), polyether ether ketone (PEEK), liquid crystal polymer (LCP), polyoxymethylene (POM), acrylonitrile butadiene styrene resin (ABS), styrene acrylonitrile copolymer (SAN), polypropylene (PP), polycarbonate (PC), and combinations thereof. However, the holder 160 need not be elastic and/or made of an elastic material in all aspects of the present invention are not limited thereto.

The elastic holder 160 is shaped to surround the electrode terminal 114 and the electrode lead plate 130. As shown, the shape is channel shaped such that the electrode lead plate 130 is disposed within the channel, while the circuit board 121 is supported at an upper portion or the top of the channel. The electrode lead plate 130 is disposed between the circuit board 121 and the opening part 164. Thus, when an external force is applied to the battery pack 100, the elastic holder 160 softens the impact transmitted to a welded portion disposed between the electrode lead plate 130 and the electrode terminal 114 of the bare cell 110.

The top cover 170 is coupled to the upper portion of the bare cell 110 and receives the circuit module 120 in an inner space thereof. The shown top cover 170 includes a cover plate 171 and a sidewall 174 extending from the cover plate 171 toward the circuit module 120.

The shown cover plate 171 has a shape approximately similar to that of the top surface 110a of the bare cell 110. An inner surface of the cover plate 171 faces and contacts the top surface 121a of the circuit board 121. A through hole 175 is formed in a region of the cover plate 171 corresponding to the external terminal 122. The external terminal 122 is exposed through the through hole 175 to the outside to electrically connect the battery pack 100 to an external electric device (not shown).

The sidewall 174 includes two ends 172 disposed on both ends of the top cover 170 in a longitudinal direction and a connection part 173 connecting the both ends 172 to each other. The two ends 172 contact regions corresponding to the short side surfaces 110b and 110c of the top surface 110a of the bare cell 110 to support the top cover 170. The connection part 173 further extends toward the circuit module 120 than both the ends 172. Portions of the connection part 173 covering upper portions of the pair of long side surfaces 110d and 110e of the bare cell 110 are surrounded by the label 190.

The bottom cover 180 is coupled to a lower portion of the bare cell 110. The bottom cover 180 includes a bottom plate 181 and extension parts 182 extending from the bottom plate 181 toward the bare cell 110. While not required in all aspects, the shown bottom plate 181 has a shape approximately equal to that of the bottom surface 110f of the bare cell 110 and adheres to the bottom surface 110f of the bare cell 110 by an adhesive member 184.

The extension parts 182 cover lower portions of the long side surfaces 110d and 110e of the bare cell 110. The extension parts 182 are surrounded by the label 190.

The label 190 surrounds and is attached to the side surfaces 110b, 110c, 110d, and 110e of the bare cell 110. The label 190 covers a portion of the connection part 173 of the top cover 170 and the extension parts 182 of the bottom cover 180. However, it is understood that the label 190 is not required in all aspects, such as where identifying indicia is imprinted on surfaces 110b, 110c, 110d and/or 110e.

Figure 3:
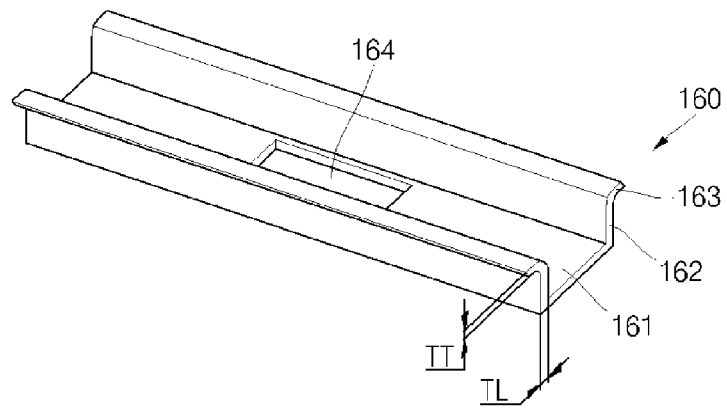
FIG. 3 illustrates an enlarged perspective view of an elastic holder of the battery pack of FIG. 1B.

A configuration of the elastic holder 160 will now be described in detail using FIG. 3 according to an aspect of the invention. FIG. 3 illustrates an enlarged perspective view of an elastic holder 160 of the battery pack 100 of FIG. 1B. Referring to FIG. 3, the elastic holder 160 includes a holder bottom part 161, a holder sidewall part 162, a holder tension part 163, and a holder opening part 164.

The holder bottom part 161 has a plate shape attached to the top surface 110a of the bare cell 100 to form a base of the elastic holder 160. The holder sidewall part 162 extends from an edge of the holder bottom part 161 toward the circuit module 120 to substantially support the circuit module 120. The shown holder sidewall part 162 is longitudinally disposed substantially parallel to a long side direction of the top surface 110a of the bare cell 110 to increase the supporting force for supporting the circuit module 120. As shown, the holder sidewall part 162 is substantially perpendicular to the holder bottom part 161.

The holder tension part 163 is bent from an edge of the holder sidewall part 162 to extend outside the holder sidewall part 162. The holder tension part 163 is a portion at which a tension is applied when the circuit module 120 is compressed toward the bare cell 110 to weld the electrode terminal 114 to the electrode lead plate 130. Here, the holder tension part 163 has a thickness TT less than a thickness TL of the holder sidewall part 162 to increase the tension of the holder tension part 163. The holder sidewall part 162 further has a thickness TL greater than a thickness TT of the holder tension part 163 to increase the supporting force for supporting the circuit module 120.

The holder opening part 164 is formed in a region of the holder bottom part 161 corresponding to the electrode terminal 114 to allow the electrode terminal 114 and the electrode lead plate 130 to be welded to each other.

As described above in relation to FIGS. 1A to 3, the battery pack 100 according to an embodiment of the present invention includes the elastic holder 160 disposed between the bare cell 110 and the circuit module 120 to support the circuit module 120. Thus, it prevents the circuit module 120 from being bent by the external impact. Therefore, the battery pack 100 has durability against the external impact.

Also, the battery pack 100, according to an embodiment of the present invention, includes the elastic holder 160 formed of the elastic material. Thus, the elastic holder 160 is flexibly tensioned in a case where the circuit module 120 is compressed toward the bare cell 110 to weld the electrode terminal 114 to the electrode lead plate 130. Therefore, the electrode terminal 114 is easily welded to the electrode lead plate 130.

Also, the battery pack 100, according to an embodiment of the present invention, includes the elastic holder 160 configured to surround the electrode terminal 114 and the electrode lead plate 130 to soften the impact transmitted to the welded portion disposed between the electrode lead plate 130 and the electrode terminal 114 of the bare cell 110 when external force is applied to the battery pack 100.

FIGS. 1A to 1C and 4 illustrate an enlarged perspective view of a holder 260 of the battery pack 100 according to another embodiment. The battery pack 100 has generally the same configuration and operation as those of the battery pack 100 according to an embodiment illustrated in FIGS. 1A to 1C and 3, except that an interference prevention groove 265 is further formed in an elastic holder 260. The elastic holder 260 is used instead of the elastic holder 160 shown in FIG. 1B. Thus, in the battery pack 100, a configuration of the interference prevention groove 265 of the elastic holder 260 will be described in detail.

Figure 4:
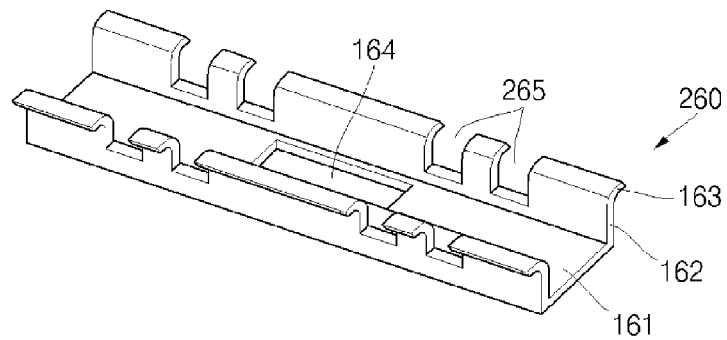
FIG. 4 illustrates an enlarged perspective view of an elastic holder of a battery pack according to another embodiment.

Referring to FIG. 4, the shown elastic holder 260 includes a holder bottom part 161, a holder sidewall part 162, a holder tension part 163, a holder opening part 164, and an interference prevention groove 265. The interference prevention groove 265 extends from a portion of the holder tension part 163 contacting a circuit module 120 toward the holder sidewall part 162. The interference prevention groove 265 prevents a circuit device 123 disposed on a bottom surface of the circuit module 120 from interfering with the elastic holder 260 to prevent the circuit module 120 from being misaligned on a bare cell 110.

As described above, the battery pack 100 includes the elastic holder 260 including the interference prevention groove 265 to further stably support the circuit module 120.

FIGS. 1A to 1C and 5 illustrate an enlarged perspective view of an elastic holder 360 of a battery pack 100 according to another embodiment. The battery pack 100 has generally the same configuration and operation as those of the battery pack 100 according to an embodiment shown in FIGS. 1A to 1C, except for a configuration of a holder sidewall part 362 of an elastic holder 360. The holder 360 is used instead of the holder 160 shown in FIG. 1B. Thus, in the battery pack 100, the configuration of the holder sidewall part 362 of the elastic holder 360 will be described in detail.

Figure 5:
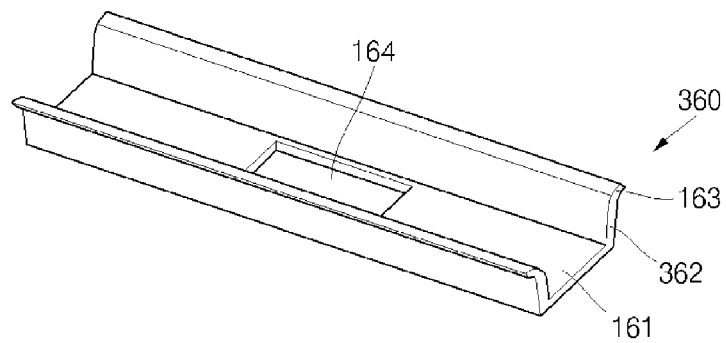
FIG. 5 illustrates an enlarged perspective view of an elastic holder of a battery pack according to another embodiment.

Referring to FIG. 5, an elastic holder 360 includes a holder bottom part 161, a holder sidewall part 362, a holder tension part 163, and a holder opening part 164. The holder sidewall part 362 extends from an edge of the holder bottom part 161 toward a circuit module 120 to substantially support the circuit module 120. The holder sidewall part 362 is longitudinally disposed parallel to a long side direction of a top surface 110a of a bare cell 110 to increase a supporting force for supporting the circuit module 120. Here, the holder sidewall part 362 has a rounded sectional shape convex from an outside direction of the holder sidewall part 362 toward an inside direction to allow the elastic holder 360 to be further flexibly tensioned in a case where the circuit module 120 is compressed toward a bare cell 110 to weld an electrode terminal 114 to an electrode lead plate 130.

As described above, the battery pack 100 includes the elastic holder 360 including the holder sidewall part 362 having the rounded sectional shape to more easily weld the electrode terminal 114 to the electrode lead plate 130.

FIGS. 1A to 1C and 6 illustrate an enlarged perspective view of an elastic holder 460 of a battery pack 100 according to another embodiment. The battery pack 100 has the same configuration and operation as those of the battery pack 100 of FIG. 5, except that an interference prevention groove 465 is further formed in the elastic holder 460. The elastic holder 460 is used instead of the holder elastic 160 shown in FIG. 1B. Thus, in the battery pack 100 according to another embodiment, a configuration of the interference prevention groove 465 of the elastic holder 460 will be described in detail.

Figure 6:
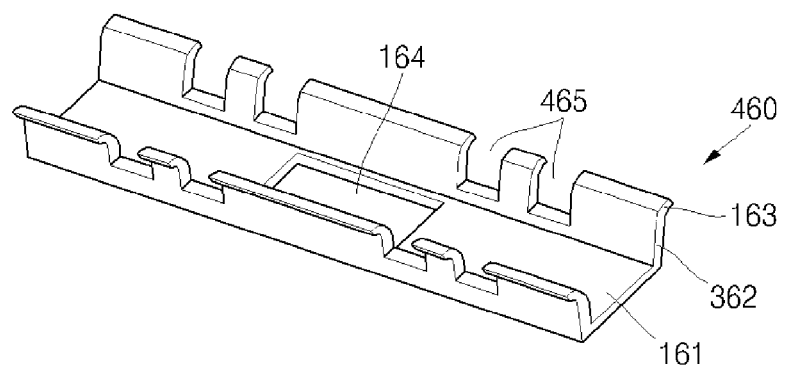
FIG. 6 illustrates an enlarged perspective view of an elastic holder of a battery pack according to another embodiment.

Referring to FIG. 6, an elastic holder 460 includes a holder bottom part 161, a holder sidewall part 362, a holder tension part 163, a holder opening part 164, and an interference prevention groove 465. The interference prevention groove 465 extends from a portion of the holder tension part 163 contacting a circuit module 120 toward the holder sidewall part 362. The interference prevention groove 465 prevents a circuit device 123 disposed on a bottom surface of the circuit module 120 from interfering with the elastic holder 460 to prevent the circuit module 120 from being misaligned on a bare cell 110.

As described above, the battery pack 100 according to another embodiment includes the elastic holder 460 including the holder sidewall part 362 having the rounded sectional shape and the interference prevention groove 465 to more easily weld the electrode terminal 114 to the electrode lead plate 130 and to further stably support the circuit module 120.

A battery pack 500 according to another embodiment will be described below with reference to FIGS. 7A and 7B. The battery pack 500 has the generally same configuration and operation as those of the battery pack 100, except for configurations of a circuit module 520, an elastic holder 560, and a top cover 570. Thus, in the battery pack 500, duplicated descriptions will be omitted, and the configurations of the circuit module 520, the elastic holder 560, and the top cover 570 will be described in detail.

Figure 7A:
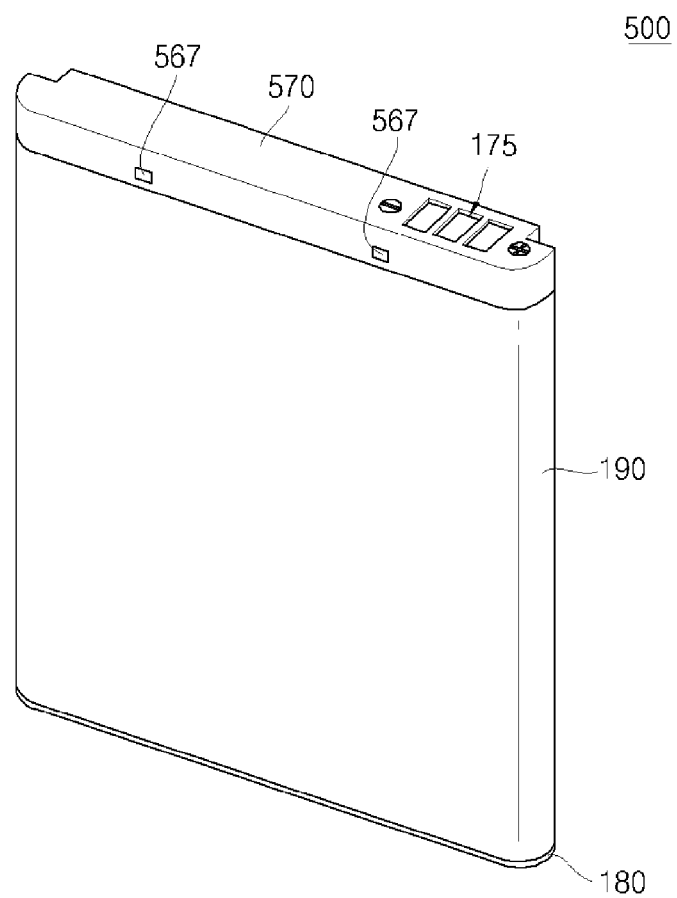
FIG. 7A illustrates a perspective view of a battery pack according to another embodiment.
Figure 7B:
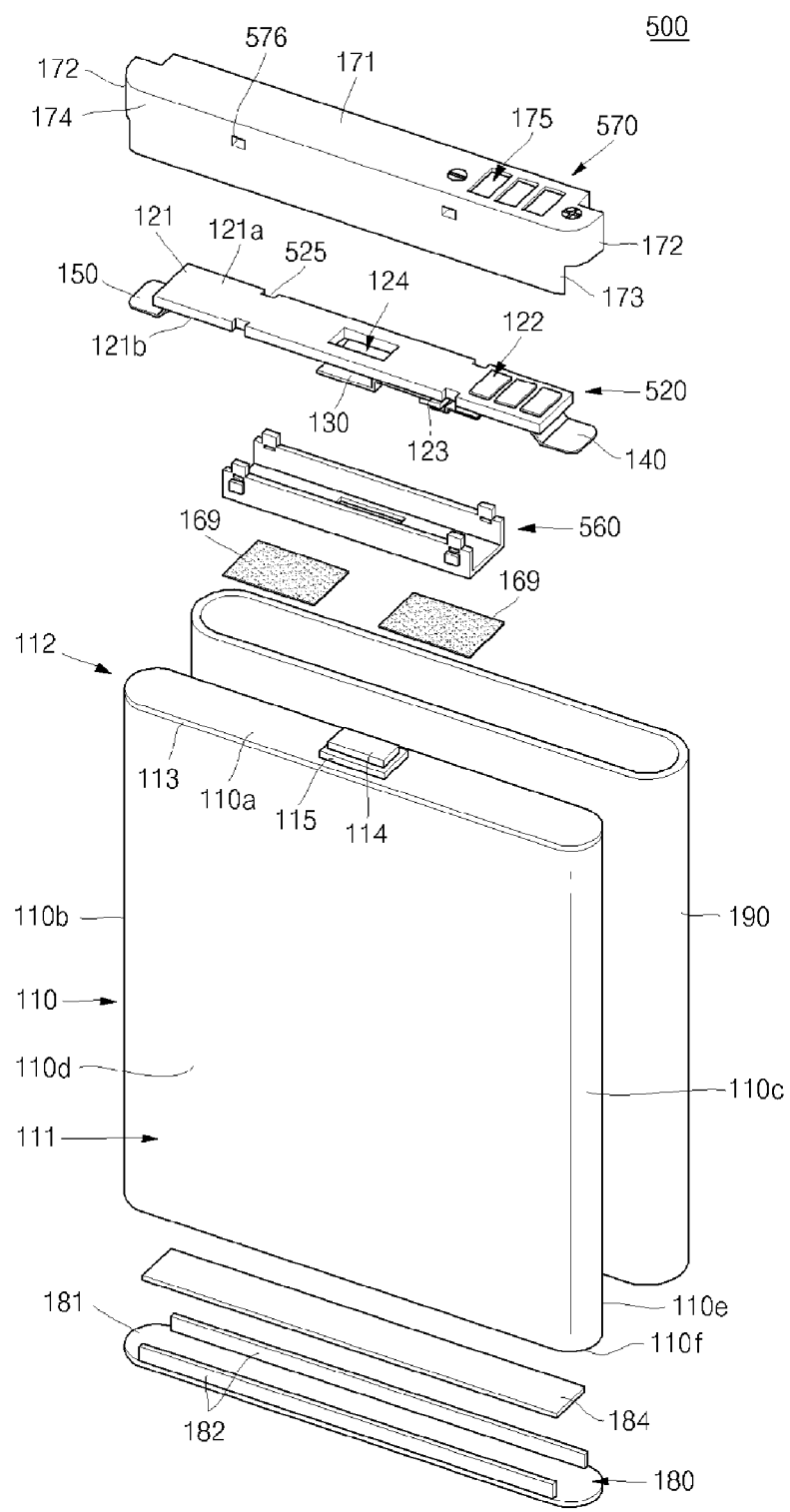
FIG. 7B illustrates an exploded perspective view of the battery pack of FIG. 7A.
Figure 8:
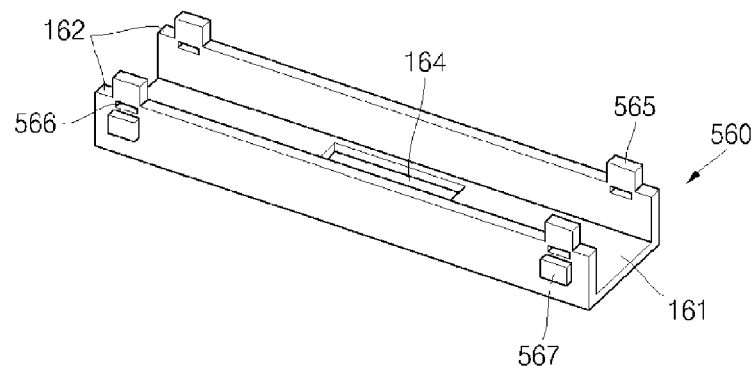
FIG. 8 illustrates an enlarged perspective view of an elastic holder of the battery pack of FIG. 7B.
Figure 9:
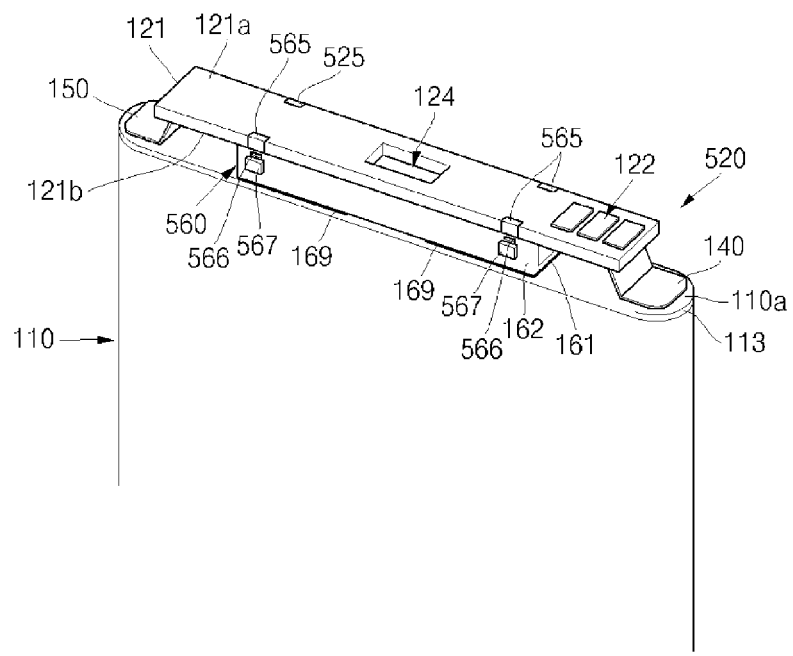
FIG. 9 illustrates a perspective view of a bare cell, the elastic holder, and a circuit module of FIG. 7B, which are coupled to each other.
Figure 10:
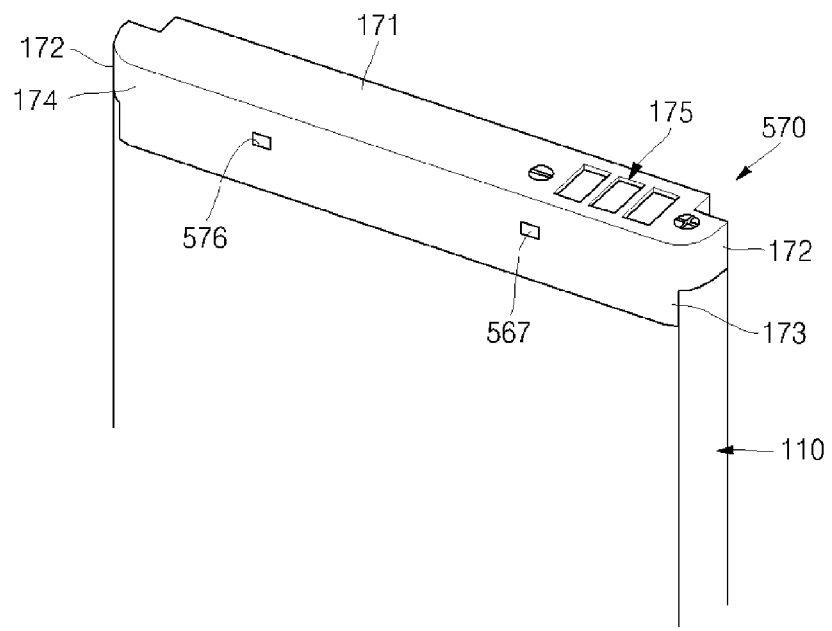
FIG. 10 illustrates a perspective view of the bare cell, the elastic holder, the circuit module, and a top cover of FIG. 7B, which are coupled to each other.

FIG. 7A illustrates a perspective view of the battery pack 500, and FIG. 7B illustrates an exploded perspective view of the battery pack 500 of FIG. 7A. FIG. 8 illustrates an enlarged perspective view of an elastic holder 560 of the battery pack 500 of FIG. 7B. FIG. 9 illustrates a perspective view of a bare cell 110, the elastic holder 560, and a circuit module 520 of FIG. 7B, which are coupled to each other, and FIG. 10 illustrates a perspective view of the bare cell 110, the elastic holder 560, the circuit module 520, and a top cover 570 of FIG. 7B, which are coupled to each other.

Referring to FIGS. 7A and 7B, the battery pack 500 includes the bare cell 110, the circuit module 520, an electrode lead plate 130, a first lead plate 140, a second lead plate 150, the elastic holder 560, the top cover 570, a bottom cover 180, and a label 190.

The circuit module 520 has generally the same configuration and operation as those of the circuit module 120 of FIG. 1B, except that the circuit module 520 further includes a rib coupling groove 525. The rib coupling groove 525 is formed in a position of a circuit board 121 corresponding to a rib of the elastic holder 560 that will be described below. Specifically, the rib coupling groove 525 is provided in plurality and formed in an outer circumference of a long side direction of the circuit board 121 as shown, but can be located elsewhere. The rib coupling groove 525 serves as a coupling unit for physically coupling the circuit module 520 to the elastic holder 560.

The elastic holder 560 has the same operation as that of the elastic holder 160 of FIG. 1B except for a configuration of the elastic holder 560. Referring to FIG. 8, the elastic holder 560 includes a holder bottom part 161, a holder sidewall part 162, a holder opening part 164, a rib 565, a tension hole 566, and a sidewall protrusion 567. Since the holder bottom part 161, the holder sidewall part 162, and the holder opening part 164 are already described above, duplicated descriptions will be omitted.

The rib 565 protrudes from an edge of the holder sidewall part 162 toward the circuit module 520. Referring to FIG. 9, the rib 565 is inserted into the rib coupling groove 525 of the circuit board 121 to physically couple the circuit module 520 to the elastic holder 560. The rib 565 is integrally formed with the elastic holder 560 or is separately formed.

The tension hole 566 is formed in a position of the holder sidewall part 162 corresponding to the rib 565. The elastic holder 560 is flexibly tensioned by the tension hole 566 in a case where the circuit module 520 is compressed toward the bare cell 110 to weld an electrode terminal 114 to an electrode lead plate 130. Thus, the elastic holder 560 allows the electrode terminal 114 and the electrode lead plate 130 to be easily welded to each other.

The sidewall protrusion 567 is disposed below the tension hole 566 of the holder sidewall part 162. Referring to FIG. 10, the sidewall protrusion 567 is inserted into a protrusion coupling hole 576 of a top cover 570 that will be described below to serve as a coupling unit for physically coupling the elastic holder 560 to the top cover 570.

The top cover 570 has the same configuration and operation as those of the top cover of FIG. 1B except that the top cover 570 further includes the protrusion coupling hole 576. The protrusion coupling hole 576 has a shape such that the sidewall protrusion 567 of the elastic holder 560 is inserted into the protrusion coupling hole 576. The protrusion coupling hole 576 serves as a coupling unit for physically coupling the elastic holder 560 to the top cover 570.

As described above, the battery pack 500, according to another embodiment of the present invention, includes the elastic holder 560 including the tension hole 566. Thus, the elastic holder 560 is flexibly tensioned where the circuit module 520 is compressed toward the bare cell 110 to weld the electrode terminal 114 to the electrode lead plate 130. As a result, the elastic holder 560 allows the electrode terminal 114 and the electrode lead plate 130 to be easily welded to each other.

Also, the battery pack 500, according to another embodiment of the present invention, includes the elastic holder 560 including the rib 565 and the sidewall protrusion 567. Thus, the elastic holder 560 is physically coupled to the circuit module 520 and the top cover 570. Accordingly, in the battery pack 500 according to another embodiment, a coupling force between the bare cell 110 and the top cover 570 increases. Therefore, the battery pack 500 according to another embodiment has significantly improved durability against the external impact.

The battery pack, according to another embodiment of the present invention, has the same configuration and operation as those of the battery pack 500 of FIG. 7B, except for a configuration of a holder sidewall part 662 of an elastic holder 660. Thus, the configuration of the holder sidewall part 662 of the elastic holder 660 will be described in detail.

Figure 11:
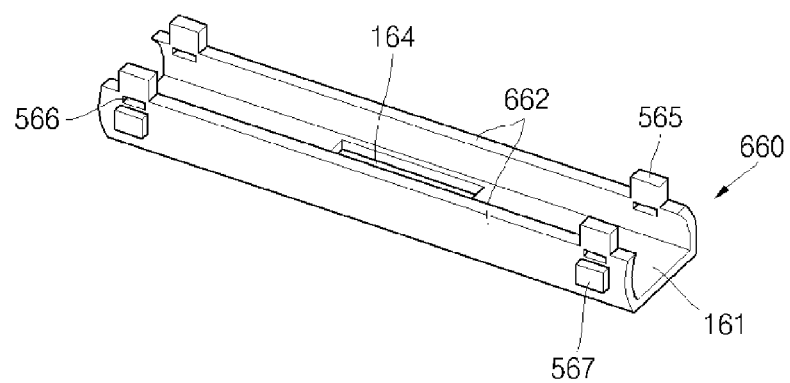
FIG. 11 illustrates an enlarged perspective view of an elastic holder of a battery pack according to another embodiment.

FIGS. 7A, 7B and 11 illustrate an enlarged perspective view of an elastic holder 660 of a battery pack 500 according to another embodiment. The elastic holder 660 is used instead of the elastic holder 560 shown in FIG. 7B. Referring to FIG. 11, the elastic holder 660 includes a holder bottom part 161, a holder sidewall part 662, a holder opening part 164, a rib 565, a tension hole 566, and a sidewall protrusion 567.

The holder sidewall part 662 has a rounded sectional shape convex from an outside direction of the holder sidewall part 662 toward an inside direction. Thus, the holder sidewall part 662 allows the elastic holder 660 to be further flexibly tensioned in a case where a circuit module 520 is compressed toward a bare cell 110 to weld an electrode terminal 114 to an electrode lead plate 130.

As described above, the battery pack 500 includes the elastic holder 660 including the holder sidewall part 662 having the rounded sectional shape to more easily weld the electrode terminal 114 to the electrode lead plate 130.

Figure 12:
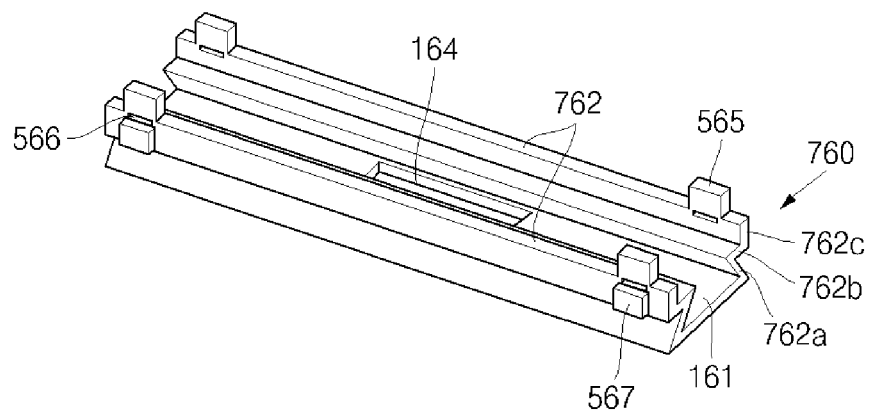
FIG. 12 illustrates an enlarged perspective view of an elastic holder of a battery pack according to another embodiment.

FIGS. 7A, 7B and 12 illustrate an enlarged perspective view of an elastic holder 760 of a battery pack 500 according to another embodiment. The elastic holder 760 is used instead of the elastic holder 560 shown in FIG. 7B. The battery pack 500 has generally the same configuration and operation as those of the battery pack 500 of FIG. 7B, except for a configuration of a holder sidewall part 762 of the elastic holder 760, thus, the configuration of the holder sidewall part 762 of the elastic holder 760 will be described in detail.

Referring to FIG. 12, an elastic holder 760 includes a holder bottom part 161, a holder sidewall part 762, a holder opening part 164, a rib 565, a tension hole 566, and a sidewall protrusion 567. The holder sidewall part 762 includes a first bending part 762a, a second bending part 762b, and a third bending part 762c. The first bending part 762a extends from the holder bottom part 161 such that it is inclined in an inside direction of the elastic holder 760. The second bending part 762b is bent from the first bending part 762a to extend in an outside direction of the elastic holder 760 such that it is parallel to the holder bottom part 161. The third bending part 762c extends from the second bending part 762b such that it is perpendicular to the second bending part 762b. The holder sidewall part 762 allows the elastic holder 760 to be further flexibly tensioned when a circuit module 520 is compressed toward a bare cell to weld an electrode terminal 114 to an electrode lead plate 130.

As described above, the battery pack 500 according to another embodiment includes the holder sidewall part 762 including the first to third bending parts 762a, 762b, and 762c to more easily weld the electrode terminal 114 to the electrode lead plate 130.

Figure 13:
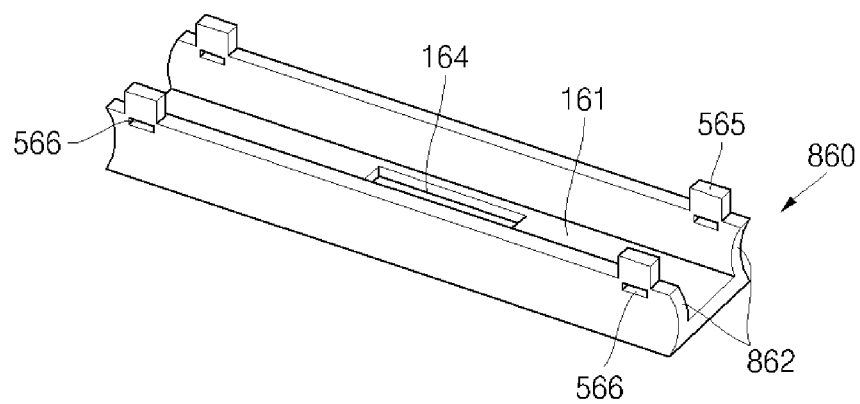
FIG. 13 illustrates an enlarged perspective view of an elastic holder of a battery pack according to another embodiment.

FIGS. 7A, 7B and 13 illustrate an enlarged perspective view of an elastic holder 860 of a battery pack 500 according to another embodiment of the present invention. The battery pack 500 has the generally same configuration and operation as those of the battery pack 500 of FIG. 7B, except for a configuration of a holder sidewall part 862 of the elastic holder 860 which is used instead of the elastic holder 560 shown in FIG. 7B. Thus, in the battery pack 500, the configuration of the holder sidewall part 862 of the holder 860 will be described in greater detail.

Referring to FIG. 13, an elastic holder 860 includes a holder bottom part 161, a holder sidewall part 862, a holder opening part 164, a rib 565, a tension hole 566, and a sidewall protrusion 567.

The holder sidewall part 862 has a rounded sectional shape convex from an outside direction of the holder sidewall part 862 toward an inside direction. Thus, the holder sidewall part 862 allows the elastic holder 860 to be further flexibly tensioned when a circuit module 520 is compressed toward a bare cell 110 to weld an electrode terminal 114 to an electrode lead plate 130.

As described above, the battery pack 500 according to another embodiment includes the elastic holder 860 including the holder sidewall part 862 having the rounded sectional shape to more easily weld the electrode terminal 114 to the electrode lead plate 130.

Figure 14:
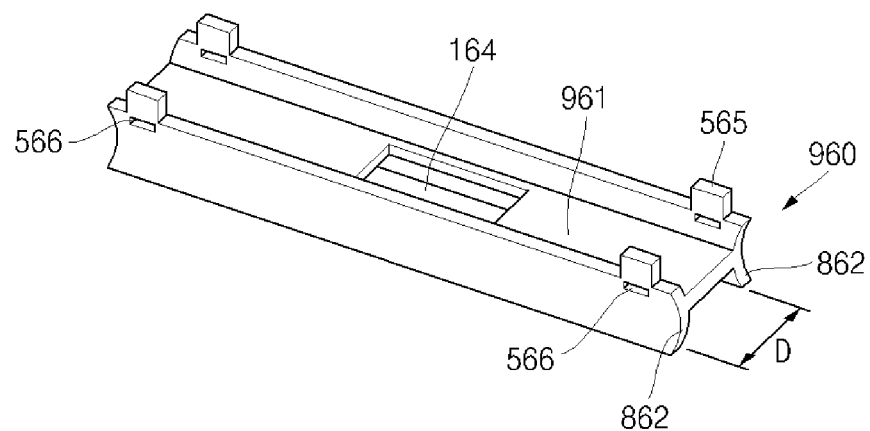
FIG. 14 illustrates an enlarged perspective view of an elastic holder of a battery pack according to another embodiment.

FIGS. 7A, 7B and FIG. 14 illustrate an enlarged perspective view of an elastic holder 960 of a battery pack 500 according to another embodiment. The battery pack 500 has generally the same configuration and operation as those of the battery pack 500 of FIG. 7B, except for configurations of a holder sidewall part 862 of the elastic holder 960 and a holder bottom part 961 connected to the holder sidewall part 862 at a middle portion in a vertical direction of the holder sidewall part 862, and omission of a sidewall protrusion 567. The elastic holder 960 is used instead of the elastic holder 560 shown in FIG. 7B. Thus, in the battery pack 500, the configurations of the holder sidewall part 862 of the elastic holder 960 and the holder bottom part 961 will be described in detail.

Referring to FIG. 14, an elastic holder 960 includes a holder bottom part 961, holder sidewall parts 862, a holder opening part 164, a rib 565, and a tension hole 566. As shown, the holder 960 has an "H" shaped cross section, and has channels above and below the bottom part 961. The holder bottom part 961 is spaced from the top surface 110a of the bare cell 110 of FIG. 7B toward a circuit module 520 and disposed parallel to the top surface 110a of the bare cell 110.

Since the holder sidewall part 862 is already described in FIG. 12, duplicated descriptions will be omitted. However, the holder sidewall parts 862 of FIG. 14 face each other with respect to the holder bottom part 961. Also, the holder sidewall parts 862 are connected to the holder bottom part 961 at middle portions thereof. Here, a spaced distance D of the holder sidewall parts 862 facing each other at the portions contacting a top surface 110a of a bare cell 110 is less than a width of the top surface 110a of the bare cell 110, i.e., a width between one long side surface 110d of the bare cell 110 and the other long side surface 110e. This is done for the reason that the holder sidewall part 862 is separated from the top surface 110a of the bare cell 110 in a case where a circuit module 520 is compressed toward the bare cell 110 to weld an electrode terminal 114 to an electrode lead plate 130 after the circuit module 120 is seated on the top surface 110a of the bare cell 110.

As described above, the battery pack 500 includes the elastic holder 960 including the holder sidewall part 862 having a rounded sectional shape to more easily weld the electrode terminal 114 to the electrode lead plate 130.

Since the battery pack according to the embodiments includes the elastic holder disposed between the bare cell and the circuit module to support the circuit module, it prevents the circuit module from being bent by an external impact. In addition, the battery pack has durability against external impacts. Therefore, the quality of the battery pack is improved.

Also, the battery pack, according to the embodiments of the present invention, includes the elastic holder formed of the elastic material. Thus, the elastic holder is flexibly tensioned in a case where the circuit module is compressed toward the bare cell to weld the electrode terminal to the electrode lead plate. Therefore, the electrode terminal is easily welded to the electrode lead plate.

Also, the battery pack according to the embodiments includes the elastic holder configured to surround the electrode terminal and the electrode lead plate to soften the impact transmitted to the welded portion disposed between the electrode lead plate and the electrode terminal of the bare cell when external force is applied to the battery pack.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A battery pack comprising:
    a bare cell on which an electrode terminal protrudes from a surface thereof;
    a circuit module disposed on the surface of the bare cell and electrically connected to the bare cell; and
    an elastic holder disposed between the circuit module and the surface of the bare cell and through which the electrode terminal passes, wherein the elastic holder comprises:
    a holder bottom part attached to the surface of the bare cell;
    a holder sidewall part extending from an edge of the holder bottom part toward the circuit module and the holder sidewall part is disposed parallel to only a long side direction of the surface of the bare cell, and
    a holder tension part extending along the entirety of the holder sidewall part and bent from an edge of the holder sidewall part to extend in a direction away from the holder sidewall part so that the holder tension part is parallel to a lower surface of the circuit module or a tension hole formed in the holder sidewall part,
    wherein an upper surface of the holder tension part is directly in contact with the lower surface of the circuit module,
    wherein the elastic holder comprises an elastic material.

2. The battery pack as claimed in claim 1, wherein the elastic holder comprises a plastic material.

3. The battery pack as claimed in claim 1, wherein the elastic holder comprises a material selected from the group consisting of ethylene vinylacetate copolymer (EVA), thermoplastic polyamide elastomer (TPAE), polyethylene (PE), thermoplastic polyester elastomer (TPEE), polyether ether ketone (PEEK), liquid crystal polymer (LCP), polyoxymethylene (POM), acrylonitrile butadiene styrene resin (ABS), styrene acrylonitrile copolymer (SAN), polypropylene (PP), polycarbonate (PC), and combinations thereof.

4. The battery pack as claimed in claim 1, wherein the elastic holder is attached to the surface of the bare cell by an adhesive member.

5. The battery pack as claimed in claim 1, wherein the elastic holder further comprises:
    a holder opening part formed in a region of the holder bottom part corresponding to the electrode terminal.

6. The battery pack as claimed in claim 5, wherein the holder tension part has a thickness less than a thickness of the holder sidewall part.

7. The battery pack as claimed in claim 5, wherein the holder sidewall part is perpendicular to the holder bottom part.

8. The battery pack as claimed in claim 5, wherein the holder sidewall part has a rounded sectional shape convex from an outside direction of the holder sidewall part toward an inside direction.

9. The battery pack as claimed in claim 5, further comprising an interference prevention groove extending from a portion of the holder tension part contacting the circuit module toward the holder sidewall part.

10. The battery pack as claimed in claim 1, further comprising an electrode lead plate coupled to a bottom surface of the circuit module and connected to the electrode terminal.

11. The battery pack as claimed in claim 1, wherein the elastic holder comprises a rib insertedly coupled to the circuit module.

12. The battery pack as claimed in claim 11, wherein the rib is integrally formed with the elastic holder.

13. The battery pack as claimed in claim 11, wherein the circuit module comprises a circuit board, and a rib coupling groove is formed in a position of the circuit board corresponding to the rib and into which the rib is inserted.

14. The battery pack as claimed in claim 13, wherein the rib coupling groove is disposed in an outer circumference of a long side direction of the circuit board.

15. The battery pack as claimed in claim 11, wherein the elastic holder further comprises:
   a holder opening part formed in a region of the holder bottom part corresponding to the electrode terminal,
   wherein the rib protrudes from an edge of the holder sidewall part adjacent to the tension hole toward the circuit module.

16. The battery pack as claimed in claim 15, wherein the holder sidewall part is perpendicular to the holder bottom part.

17. The battery pack as claimed in claim 15, wherein the holder sidewall part has a rounded sectional shape convex from an inside direction of the holder sidewall part toward an outside direction.

18. The battery pack as claimed in claim 15, wherein the holder sidewall part comprises:
   a first bending part extending from the holder bottom part such that it is inclined in an inside direction of the elastic holder;
   a second bending part bent from the first bending part to extend in an outside direction of the elastic holder to be parallel to the holder bottom part; and
   a third bending part extending from the second bending part to be perpendicular to the second bending part.

19. The battery pack as claimed in claim 15, wherein the holder sidewall part has a rounded sectional shape convex from an outside direction of the holder sidewall part toward an inside direction.

20. The battery pack as claimed in claim 15, further comprising a sidewall protrusion disposed below the tension hole of the holder sidewall part.

21. The battery pack as claimed in claim 20, further comprising a top cover covering the circuit module,
   wherein the top cover comprises a protrusion coupling groove in which the sidewall protrusion is inserted.

22. The battery pack as claimed in claim 11, wherein the elastic holder comprises:
   a holder bottom part disposed at a position spaced from the surface of the bare cell toward the circuit module, the holder bottom part being parallel to the surface of the bare cell;
   holder sidewall parts facing each other with respect to the holder bottom part and connected to the holder bottom part in middle regions thereof, the holder sidewall parts having a rounded sectional shape protruding toward a center of the holder bottom part;
   a tension hole formed in the respective holder sides parts; and
   a holder opening part formed in a region of the holder bottom part corresponding to the electrode terminal,
   wherein the rib protrudes from an edge of the holder sidewall part corresponding to the tension hole toward the circuit module.

23. The battery pack as claimed in claim 22, wherein a spaced distance of the holder sidewall parts facing each other at the portions contacting the surface of the bare cell is less than a width of a top surface of the bare cell.

24. The battery pack as claimed in claim 22, wherein the holder sidewall parts are disposed parallel to a long side direction of the surface of the bare cell.

25. The battery pack of claim 1, wherein the holder comprises:
   a bottom surface having the hole;
   a first sidewall part extending from the bottom surface towards the circuit board; and
   a second sidewall part extending from the bottom surface towards the circuit board,
   wherein the first sidewall part contacts one of two opposing surfaces of the circuit board and the second sidewall part contacts the other of the two opposing surfaces of the circuit board.

26. The battery pack of claim 25, wherein at least one of the first sidewall part and the second sidewall part contacts a bottom surface of the circuit board.

27. The battery pack of claim 25, wherein at least one of the first sidewall part and the second sidewall part contacts a side surface of the circuit board.

28. A battery pack comprising:
   a bare cell on which an electrode terminal protrudes from a surface thereof;
   a circuit board on which is mounted at least one circuit used in the operation of the battery pack;
   an electrode lead plate coupled to a bottom surface of the circuit board and electrically connected to an electrode terminal; and
   a holder having a channel housing the electrode lead plate and supporting the circuit board above the electrode lead plate, the holder further comprising a hole through which the electrode lead plate is connected to the electrode terminal of the bare cell, wherein the plastic holder comprises:
   a holder bottom part attached to the surface of the bare cell;
   a holder sidewall part extending from an edge of the holder bottom part toward the circuit module and the holder sidewall part is disposed parallel to only a long side direction of the surface of the bare cell, and
   a holder tension part extending along the entirety of the holder sidewall part and bent from an edge of the holder sidewall part to extend in a direction away from the holder sidewall part so that the holder tension part is parallel to a lower surface of the circuit board or a tension hole formed in the holder sidewall part,
   wherein an upper surface of the holder tension part is directly in contact with the lower surface of the circuit board,
   wherein the holder comprises an elastic material.

* * * * *